April 10, 1956   A. C. BECK   2,741,740
PULSE HETERODYNE TRANSMISSION TESTING SYSTEMS
Filed Sept. 12, 1951
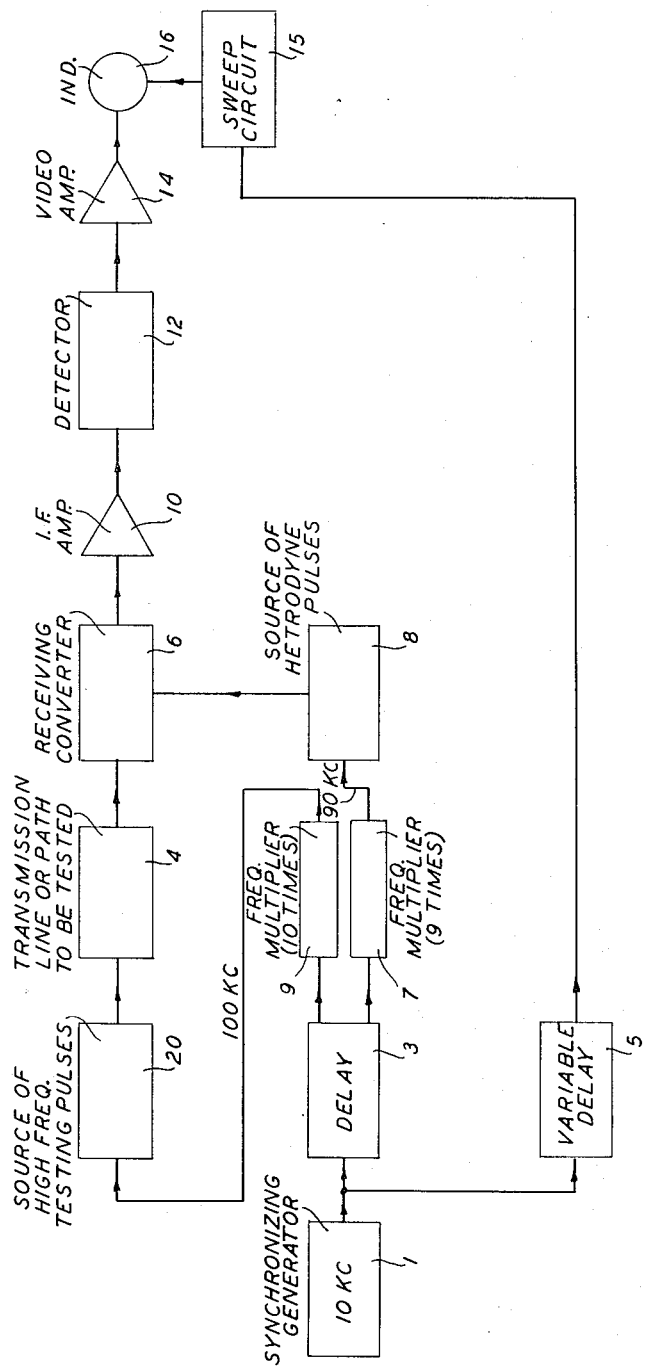
INVENTOR
A. C. BECK
BY
H. O. Wright
ATTORNEY

United States Patent Office 2,741,740
Patented Apr. 10, 1956

2,741,740

PULSE HETERODYNE TRANSMISSION TESTING SYSTEMS

Alfred C. Beck, Red Bank, N. J., assignor to Bell Telephone Laboratories, Incorporated, New York, N. Y., a corporation of New York Application September 12, 1951, Serial No. 246,281

12 Claims. (Cl. 324—58)

This invention relates to a method and apparatus for testing high frequency electromagnetic wave transmission systems. More particularly, it relates to a method and apparatus for determining the presence of unwanted modes of wave transmission or the existence of multiple path transmission in a high frequency electromagnetic wave transmission system, or the like.

In the transmission of high frequency electromagnetic waves through a long wave-guide transmission line, irregularities, distortion or deformation and bends in the wave guide may give rise to more or less degeneration of the original wave into other than the desired mode of transmission. Many of these spurious or undesired modes have velocities of propagation through the wave guide which vary from those of other modes, including the velocity of the wanted or desired mode of transmission. In view of the high velocities of propagation involved, and the small difference in velocities of the different modes, the time intervals between the arrivals of several modes having different propagation velocities at the output end of a wave-guide transmission line of finite length, are frequently very short, for example, in the order of a few hundredths of a microsecond.

Likewise, in connection with the direct, or line of sight, transmission of radio waves, in many instances several components of a particular transmitted wave arrive at the receiving station at slightly different instants. This phenomenon is believed to result from the simultaneous transmission of the wave over several different paths between the transmitter and receiver, some of which paths involve reflection, refraction or diffraction effects.

A method of detecting such effects (i. e., multimode or multipath transmission effects) is to transmit an extremely short test pulse over the transmission path to be tested and to observe the number and relative times of arrival of resulting pulses at the receiving end of the path.

Since the time intervals involved may be, as stated above, only a few hundredths of a microsecond, the test pulse should be extremely short. For example, one hundredth microsecond pulse or shorter may be required in order not to overlap, or mask out, adjacent (in time) pulses at the receiving end, resulting from the above-described spurious mode waves in wave-guide transmission or from waves arriving over other than the direct (line of sight) path in radio transmission.

The test pulse can, of course, be periodically repeated at intervals of time sufficient to permit all pulses resulting from each particular test pulse to arrive at the receiving end of the transmission system prior to transmission of the next successive test pulse and a pattern or trace of received pulses on a time scale can be provided in a manner similar to that employed in connection with radar systems in which the well-known type A indication appears on an oscilloscope.

Two outstanding difficulties must be overcome, however, before a practicable testing system of the above-indicated type can be constructed.

The first difficulty arises from the fact that an extremely wide band of frequencies is required to transmit a pulse as short as .01 microsecond, for example a 200 megacycle wide band for amplitude modulation at radio and intermediate frequencies, and a 100 megacycle band at video frequencies (after detection), and while transmission of such a wide frequency band is practicable at radio frequencies through a wave-guide or free space path, it is very difficult and expensive to construct intermediate frequency circuits which will satisfactorily transmit such a wide frequency band.

The second difficulty is that the spacings in time between the pulses resulting, at the receiving end of the line, from the test pulse are extremely small in many instances, as noted above, and the pulses are of such short duration that it would be very difficult to present them clearly on a time trace of any presently known oscilloscope.

To overcome the above difficulties the present invention proposes that instead of employing a continuous wave, beating oscillator in the receiver to convert the received pulses to a suitable intermediate frequency, that the beating oscillator also be pulsed, but at a rate differing by a predetermined convenient amount from the rate of the above-mentioned periodically-transmitted, test pulses. The beating oscillator pulses should preferably be no longer than the test pulses (.01 microsecond for the example assumed above). The resulting intermediate frequency pulses will, by virtue of a sort of "stroboscopic" effect, have a repetition rate equal to the difference between the test pulse rate and the beating oscillator pulse rate. The length of the resulting intermediate frequency pulses and the time intervals between them will also both be increased in proportion to the ratio of the transmitted pulse rate to the difference between the transmitted and beating oscillator pulse rates.

By way of example, if the test pulse repetition rate is 100,000 per second and the beating oscillator rate is 90,000 per second, the intermediate frequency pulse rate will be 10,000 per second. Further, if the test pulse length is .01 microsecond, as assumed by way of example above, the intermediate frequency pulses will each be .1 microsecond long. For satisfactory transmission of a pulse of the last-mentioned length, a band width in the order of only 20 megacycles at intermediate frequencies and 10 megacycles at video frequencies is required, so that by application of the above-described principles, it becomes entirely practicable to construct suitable intermediate frequency circuits for the testing system of the invention. Furthermore, since all time intervals, as well as the lengths of the intermediate frequency pulses, have been increased (in the above example) by the factor 10, it also becomes entirely feasible to display them on an ordinary cathode ray oscilloscope along a simple time trace or sweep. The sweep, of course, is synchronized with the intermediate frequency pulse repetition rate and the display of pulses, representing the test pulse and pulses resulting from spurious modes in a wave-guide transmission line, (or multipath transmission in a radio transmission system) provides an indication of the number, relative amplitudes, relative timing and, by interpretation, of the types of spurious modes (or the number, relative amplitudes, and lengths of other radio transmission paths) by which energy from the transmitter is arriving at the receiving end of the transmission system.

In accordance with the above, a principal object of the invention is to provide a method and apparatus for testing a wave-guide transmission line to obtain an indication of the presence, number, relative amplitudes, relative timing, and character of spurious modes generated during transmission of a desired mode wave through said line.

A further object is to provide a method and system for testing a radio frequency, line of sight, transmission path to obtain an indication of the presence, number and lengths of radio paths other than the line of sight path.

Another object is to provide methods and systems, as just described, in which very short, high frequency, testing pulses can be employed without requiring the use of extremely wide band intermediate frequency circuits.

A further object is to provide a testing system by which the transient signal distortion characteristics of a transmission path can be determined.

A still further object is to provide methods and systems, as just described, in which simple practicable indicators can be employed.

Other and further objects will become apparent during the course of the following description of preferred illustrative embodiments of the invention shown in the accompanying drawing in which:

The sole figure of the drawing is a block schematic diagram of a testing circuit embodying the principles of the invention.

In more detail in Fig. 1, unit 20 is a source of regularly recurrent, high frequency, pulses. It can be of any of the several types of pulse transmitters well known to those skilled in the art and can, by way of a specific example for certain purposes to be discussed in detail hereunder, generate pulses .01 microsecond long, at a rate of 100,000 pulses per second, and the frequency of the pulses can be 9,000 megacycles. As a specific example of a pulse generator for generating the above-proposed pulses, reference may be had to the copending application of C. C. Cutler, Serial No. 118,889, filed September 30, 1949, now Patent No. 2,617,930.

Unit 4 can represent the high frequency transmission line to be tested. It can be a long wave-guide transmission line or a radio transmission path, or the like.

Unit 6 can be a substantially conventional radio frequency receiving converter, or demodulator, in which the pulses transmitted through unit 4 are received from the output of unit 4, and combined with radio frequency heterodyne pulses from a source 8 to generate a series of intermediate frequency pulses. The pulses from source 8 can be similar to those generated by source 20 but, of course, have a frequency differing from that of the pulses from source 20 by a convenient intermediate frequency such, for example, as 70 megacycles. The repetition rate of the pulses from source 8 is, as discussed hereinabove, different from the rate of the pulses from source 20 so that the intermediate frequency pulses will have a rate equal to the difference between the two first-mentioned rates and a length proportionally greater. Also, intervals between the wanted and the spurious mode pulses, and between successive spurious mode pulses will be likewise increased for the resulting intermediate frequency pulse groups. By way of example, a suitable pulse repetition rate for source 8, with the above-recommended rate for pulses from source 20, can be 90,000 pulses per second so that the intermediate frequency pulse rate will be 10,000 pulses per second. The length of the pulses from source 8 can, as mentioned above, preferably be substantially the same as those from source 20.

The intermediate frequency pulses corresponding to the test pulse and resulting pulses (arising from spurious mode or multipath transmission) are amplified in unit 10, and detected in unit 12 to obtain video frequency pulses, the latter being then displayed on a time versus amplitude trace by cathode-ray oscilloscope indicator 16.

The source of high frequency testing pulses 20 is synchronized at a 100 kilocycle repetition rate by the output of a ten times multiplier 9 whose input comes from the 10 kilocycle synchronizing generator 1 through a short fixed delay 3. The purpose of delay unit 3 is to allow the cathode ray tube sweep circuit to start soon enough to show the outgoing pulse. The source of heterodyne pulses 8 is synchronized at a 90 kilocycle repetition rate by the output of the nine times multiplier 7, which is also driven by the synchronizing generator 1 through delay unit 3.

Sweep circuit 15 is synchronized by the output wave from synchronizing generator 1 through a variable delay unit 5, and sweeps the ray of the cathode ray oscilloscope horizontally across its screen in synchronism with the recurring series of intermediate frequency pulses. The purpose of variable delay unit 5 is to permit viewing pulses delayed in time beyond the lengths of short sweeps that may be employed to give good horizontal resolution on indicator 16. The video pulses, resulting from the detection in detector 12 of the intermediate frequency pulses, are, of course, imposed upon the vertical deflecting plates of cathode ray oscilloscope indicator 16. The relative heights of the vertical deflections resulting from the video pulses are, therefore, proportional to their respective relative amplitudes. The positions of the pulses along the trace indicate their relative times of arrival at the receiving end of the transmission line. With these indications, one skilled in the art, with the aid of background knowledge such as the types of spurious modes likely to be generated in the line and their relative propagation velocities, can estimate the number, relative amplitudes and types of spurious modes present. For a radio transmission path, one skilled in the art can estimate the number of paths of transmission, their relative lengths and the relative amplitudes of the signal components transmitted by each.

Systems of the invention are obviously readily adapted to other purposes such, for example, as fault location in long wave guides or coaxial transmission lines by reflected pulses, for which uses the receiver will, of course, be at the same end of the line as the transmitter. The transition from such a system to a radar system is, of course, a simple and obvious step and numerous and varied radar systems employing the principles of the invention will readily occur to those skilled in the art.

A very similar system to that illustrated by the schematic block diagram of Fig. 1 can be employed to determine the transient signal distortion characteristics of a particular transmission path. For such a system, however, the transmitted test pulses should be long relative to the duration of the heterodyne pulses, for example, with heterodyne pulses of .01 microsecond duration each, the test pulses should be of .1 microsecond or more duration each. The test pulses in this instance should have initially a predetermined well defined shape, such as a flat-topped rectangular shape. After transmission the received test pulses will be reproduced at the slower intermediate frequency rate and distortion of the intermediate frequency pulses from the predetermined shape will indicate to those skilled in the art the amount and nature of the distortion introduced by transmission over the circuit under test.

Numerous and varied other arrangements within the spirit and scope of the invention will readily occur to those skilled in the art. The above-described arrangements are illustrative only and by no means exhaustively cover all applications of the principles of the invention.

What is claimed is:

1. A system for testing a very high frequency, very broad band, electromagnetic wave, transmission circuit for multiple transmission of a single input signal, said system comprising means for generating very high frequency test pulses recurrent at a first predetermined periodicity, said test pulses having a duration of approximately one-hundredth microsecond and requiring a band width of substantially 200 megacycles for transmission, the interval between pulses substantially exceeding the time required to transmit one of said test pulses through said transmission circuit, means for transmitting said test pulses through said circuit, means for receiving said test pulses after transmission through said circuit, said receiving means including a heterodyning stage followed by intermediate frequency amplifying stages, said heterodyning stage including a beating oscillator providing heterodyne high frequency pulses differing in frequency from said test pulses by a convenient intermediate frequency, said heterodyne pulses each having substantially the same duration as said test pulses, the periodicity of said heterodyne pulses differing from that of said test pulses by a predetermined amount, said amplifying stages of said receiving means having a frequency band width not exceeding 20 megacycles, means comprising the said heterodyning stage for combining said received test pulses and said heterodyne pulses to obtain a series of stroboscopic readings of said received test pulses and means comprising the said amplifying stages for integrating said reading to produce recurrent "stroboscopic" pulses having a periodicity and duration determined by the difference between hte periodicities of said test and said heterodyne pulses and a frequency determined by the difference between the frequencies of said test and said heterodyne pulses, means for detecting said "stroboscopic" pulses at the output of said amplifying stages and means for displaying said detected pulses on a time versus amplitude scale to provide an indication of the number, relative amplitudes and relative timing of all received pulses resulting from the transmission of each test pulse over said transmission circuit.

2. The system of claim 1, in which said display means is a cathode ray oscilloscope having horizontal and vertical deflecting means, the detected "stroboscopic" pulses being applied to the vertical deflecting means, and a deflecting voltage synchronized with the periodic recurrence of said "stroboscopic" pulses being applied to the horizontal deflecting means.

3. The system of claim 1, in which said transmission circuit is a wave-guide transmission line.

4. The system of claim 1, in which said transmission circuit is a radio transmission path.

5. A system for testing a very high frequency, electromagnetic wave, transmission circuit, said system comprising means for generating very high frequency test pulses recurrent at a first predetermined periodicity, the interval between pulses substantially exceeding the time required to transmit one of said test pulses through said transmission circuit, means for receiving said test pulses after transmission through said circuit, said receiving means ncludng a heterodyning stage followtd by intermediate frequency amplifying stages, said heterodyning stage including a beating oscillator providing heterodyne high frequency pulses differing in periodicity from said test pulses by a predetermined amount and in frequency from said test pulses by a convenient intermediate frequency, said heterodyne pulses each having a duration sufficiently short that intermediate frequency pulses resulting from combining said test and said heterodyne pulses will not pass through said amplifying stages, means comprising the said heterodyning stage for combining the received test pulses and said heterodyne pulses to obtain a series of stroboscopic readings of said received test pulses and means comprising said amplifying stages for integrating said readings to produce recurrent "stroboscopic" pulses having a periodicity and duration determined by the difference between the periodicities of said test and said heterodyne pulses and a frequency determined by the difference in frequency between said test and said heterodyne pulses, means for detecting said "stroboscopic" pulses at the output of said amplifying stages and means for displaying said detected pulses on a time versus amplitude scale to provide an indication of the transmission characteristics of said transmission circuit.

6. The system of claim 5, in which said display means is a cathode ray oscilloscope having horizontal and vertical deflecting means, the detected "stroboscopic" pulses being applied to the vertical deflecting means, and a deflecting voltage synchronized with the periodic recurrence of said "stroboscopic" pulses being applied to the horizontal deflecting means.

7. The system of claim 5, in which said transmission circuit is a wave-guide transmission line.

8. The system of claim 5, in which said transmission circuit is a radio transmission path.

9. A system for testing a very high frequency transmission circuit, said system comprising a source of very high frequency test pulses connected to one end of said circuit, said test pulses being recurrent at a periodicity determined by the time required to transmit a test pulse over said circuit, a very high frequency receiver connected to the other end of said circuit, said receiver including a heterodyning stage followed by intermediate frequency amplifying stages, said heterodyning stage including a beating oscillator providing high frequency heterodyne pulses differing in periodicity from said test pulses by a predetermined amount and in frequency from said test pulses by a convenient intermediate frequency, said heterodyne pulses each being of sufficiently short duration that intermediate frequency pulses resulting from combining said test and said heterodyne pulses will not pass through said amplifying stages, said test pulses being at least as long as said heterodyne pulses, means comprising said heterodyne stage for combining said test and said heterodyne pulses to obtain a series of stroboscopic readings of said received test pulses and means comprising said amplifying stages for integrating said readings to produce recurrent "stroboscopic" pulses having a periodicity and duration determined by the difference between the periodicities of said test and said heterodyne pulses and a frequency determined by the difference in frequency between said test and said heterodyne pulses, means for detecting said "stroboscopic" pulses at the output of said amplifying stages and means for displaying said detected pulses on a time versus amplitude scale to provide an indication of the transmission characteristics of said transmission circuit.

10. The system of claim 9, in which said display means is a cathode ray oscilloscope having horizontal and vertical deflecting means, the detected "stroboscopic" pulses being applied to the vertical deflecting means, and a deflecting voltage synchronized with the periodic recurrence of said "stroboscopic" pulses being applied to the horizontal deflecting means.

11. The system of claim 9, in which said transmission circuit is a wave-guide transmission line.

12. The system of claim 9, in which said transmission circuit is a radio transmission path.

References Cited in the file of this patent
UNITED STATES PATENTS

| | | |
|---|---|---|
| 2,407,198 | Wolff | Sept. 3, 1946 |
| 2,425,600 | Coykendall | Aug. 12, 1947 |
| 2,549,131 | Rideout | Apr. 17, 1951 |

OTHER REFERENCES

Principles of Radar, M. I. T. Radar School Staff, second edition 1946 (McGraw-Hill Book Company).